United States Patent
Ertel et al.

(10) Patent No.: US 7,050,480 B2
(45) Date of Patent: May 23, 2006

(54) CODE ASSIGNMENT ALGORITHM FOR SYNCHRONOUS DS-CDMA LINKS WITH SDMA USING ESTIMATED SPATIAL SIGNATURE VECTORS

(75) Inventors: Richard B. Ertel, Midvale, UT (US); Thomas R. Giallorenzi, Riverton, UT (US); Eric K. Hall, Holliday, UT (US)

(73) Assignee: L3 Communications Corporation, New York, NY (US)

( * ) Notice: Subject to any disclaimer, the term of this patent is extended or adjusted under 35 U.S.C. 154(b) by 958 days.

(21) Appl. No.: 10/037,423

(22) Filed: Oct. 24, 2001

(65) Prior Publication Data

US 2002/0146060 A1    Oct. 10, 2002

Related U.S. Application Data

(60) Provisional application No. 60/243,808, filed on Oct. 27, 2000.

(51) Int. Cl.
*H04B 1/69* (2006.01)
*H04B 1/707* (2006.01)
*H04B 1/713* (2006.01)

(52) U.S. Cl. ............... 375/141; 375/130; 375/146; 375/147; 370/310; 370/329; 455/562.1

(58) Field of Classification Search ................ 375/130, 375/131, 140, 141, 144, 146–148; 370/310, 370/329; 455/562.1, 450
See application file for complete search history.

(56) References Cited

U.S. PATENT DOCUMENTS

| | | | | |
|---|---|---|---|---|
| 5,515,378 | A | * | 5/1996 | Roy et al. .................... 370/334 |
| 5,592,490 | A | * | 1/1997 | Barratt et al. ................ 370/310 |
| 5,886,988 | A | * | 3/1999 | Yun et al. .................... 370/329 |
| 6,041,237 | A | * | 3/2000 | Farsakh ..................... 455/450 |
| 6,317,612 | B1 | * | 11/2001 | Farsakh .................... 455/67.11 |
| 6,377,819 | B1 | * | 4/2002 | Gesbert et al. .......... 455/562.1 |
| 6,539,236 | B1 | * | 3/2003 | Hakkinen et al. ........... 455/525 |
| 6,671,516 | B1 | * | 12/2003 | Doi ............................ 455/509 |

\* cited by examiner

*Primary Examiner*—Phuong Phu
(74) *Attorney, Agent, or Firm*—Harrington & Smith, LLP

(57) ABSTRACT

A method is disclosed for operating a synchronous space division multiple access, code division multiple access communications system. The method operates, within a coverage area of a base station (BS) or radio base unit (RBU) having a multi-element antenna array, for estimating a SSV for individual ones of a plurality of active subscriber stations (SSs) and assigns a spreading code to a subscriber station (SS) that minimizes the similarity of the determined SSVs of the SSs in a spreading code set. A metric used to measure the similarity of the spatial signature vectors of the SSs comprises the squared sum of the inner products of same code SSs' SSV with a current SS's SSV. The step of assigning includes calculating the magnitude of the squared inner product of the SSVs of all pairs of active SSs; using the calculated values for determining $\xi_n(c)$ for each spreading code that is not already used some specified maximum number of times; and assigning to a SS the spreading code with a minimum $\xi_n(c)$.

16 Claims, 9 Drawing Sheets

WIRELESS ACCESS REFERENCE MODEL

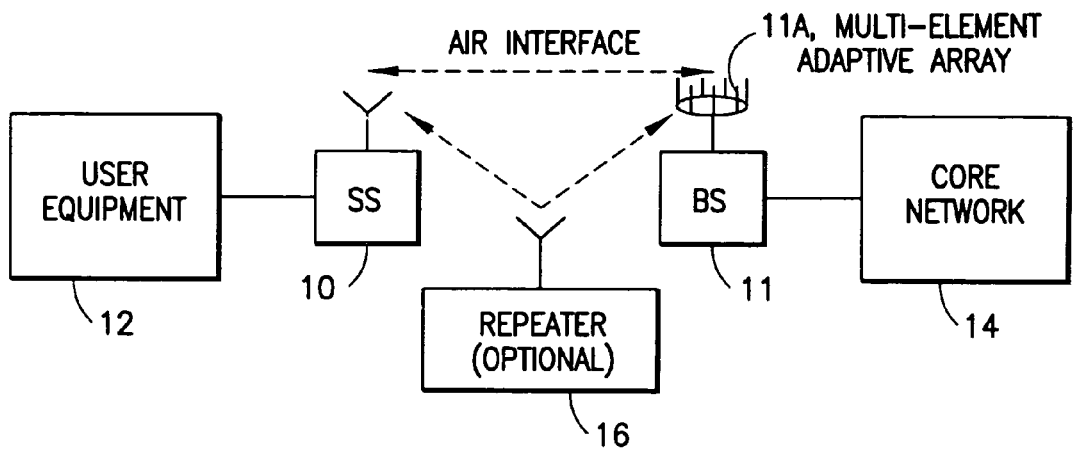
FIG.1    WIRELESS ACCESS REFERENCE MODEL
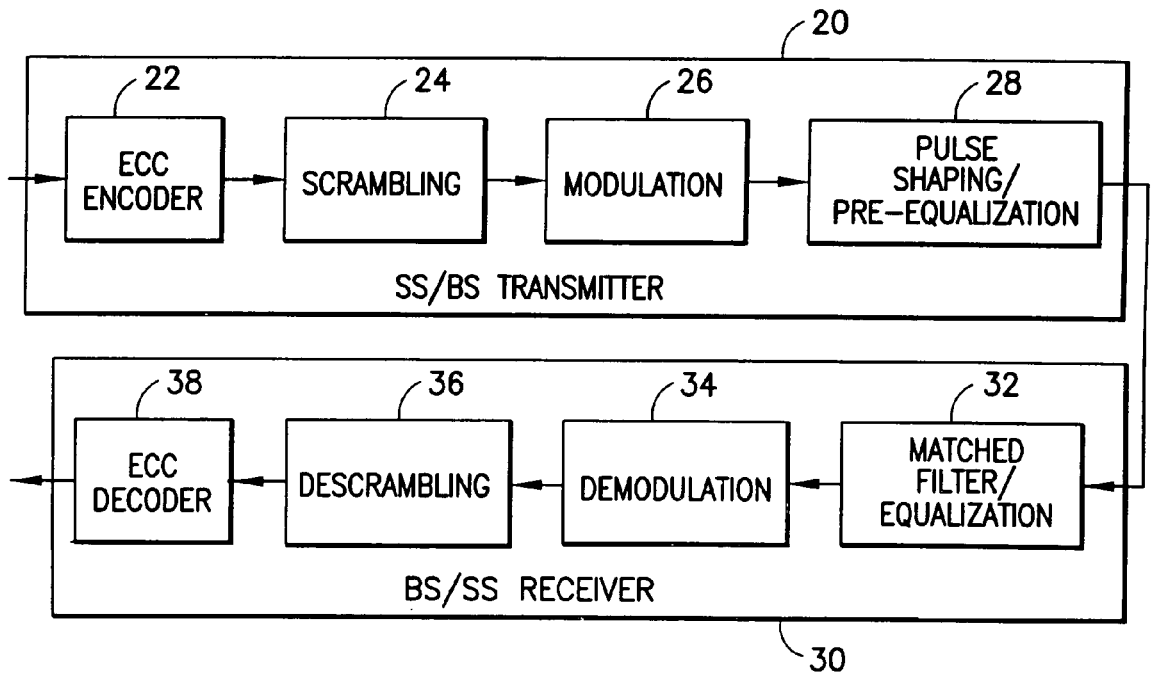
FIG.2    PHY REFERENCE MODEL SHOWING DATA FLOW
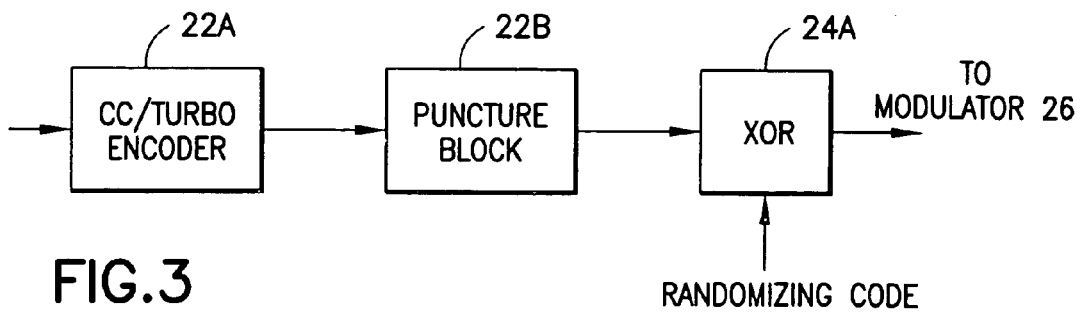
FIG.3

|  | MODULATION AND CHANNEL CODING | | |
|---|---|---|---|
| PARAMETER | QPSK w/R=4/5 CODING (1.6 BITS/SYM) | 16-QAM w/R=4/5 CODING (3.2 BITS/SYM) | 64-QAM w/R=4/5 CODING (4.8 BITS/SYM) |
| RF CHANNEL BANDWIDTH | 3.5 MHz | 3.5 MHz | 3.5 MHz |
| CHIP RATE | 2.56 Mcps | 2.56 Mcps | 2.56 Mcps |
| COMMUNICATION CHANNEL BANDWIDTH | 4.096 Mbps | 8.192 Mbps | 12.288 Mbps |
| PEAK DATA RATE | 4.096 Mbps | 8.192 Mbps | 12.288 Mbps |
| CDMA CHANNEL BANDWIDTH (SF=1) | 4.096 Mbps | 8.192 Mbps | 12.288 Mbps |
| CDMA CHANNEL BANDWIDTH (SF=16) | 256 kbps | 512 kbps | 768 kbps |
| CDMA CHANNEL BANDWIDTH (SF=128) | 32 kbps | 64 kbps | 96 kbps |
| MODULATION FACTOR | 1.17 bps/Hz | 2.34 bps/Hz | 3.511 bps/Hz |

FIG.4 HYPOTHETICAL PARAMETERS FOR A 3.5 MHz RF CHANNELIZATION

|  | QPSK | | 16 QAM | | 64 QAM | |
| --- | --- | --- | --- | --- | --- | --- |
| NUMBER OF ELEMENTS | AGGREGATE CAPACITY (Mbps) | MODULATION FACTOR | AGGREGATE CAPACITY (Mbps) | MODULATION FACTOR | AGGREGATE CAPACITY (Mbps) | MODULATION FACTOR |
| 1 | 4.096 | 1.17 | 8.192 | 2.34 | 12.288 | 3.511 |
| 2 | 8.192 | 2.34 | 16.384 | 4.68 | 24.576 | 7.022 |
| 4 | 16.384 | 4.68 | 32.768 | 9.36 | 49.152 | 14.044 |
| 8 | 32.768 | 9.36 | 65.536 | 18.72 | 98.304 | 28.088 |
| 16 | 65.536 | 18.72 | 131.072 | 37.44 | 196.608 | 56.176 |

FIG. 5  AGGREGATE CAPACITY AND MODULATION FACTORS VERSUS MODULATION TYPE AND ARRAY SIZE $$x_n(t) = \sum_{\ell=1}^{L_n} \alpha_{n,\ell}\, a(\Theta_{n,\ell})\, s_n(t-\tau_{n,\ell}) \quad \text{FIG.6A}$$

$$v_n = \sum_{\ell=1}^{L_{op}} \alpha_{n,\ell}\, a(\Theta_{n,\ell})\, \exp(-j\omega_c \tau_{n,\ell}) \quad \text{FIG.6B}$$

$$y_n(t) = [w_{n,1}^* \; w_{n,2}^* \; \wedge \; w_{n,M}^*] \begin{bmatrix} x_1(t) \\ x_2(t) \\ M \\ x_M(t) \end{bmatrix} = w_n^H x(t) \quad \text{FIG.6C}$$

$$R_{ii}(n) = \sum_{i=1, i \neq n}^{N} \sigma_s^2 v_i v_i^H + \sigma_n^2 I_M \quad \text{FIG.6D}$$

$$\text{SINR}_{opt} = \sigma_s^2 v_n^H R_{ii}^{-1}(n) v_n \quad \text{FIG.6E}$$

$$\text{SINR}_{opt}(2) = \frac{\sigma_s^2}{\sigma_n^2}\left[\|v_1\|^2 - \frac{\sigma_s^2 |v_1^H v_2|^2}{\sigma_n^2 + \sigma_s^2 \|v_2\|^2}\right] \quad \text{FIG.6F}$$

$$\text{SINR}_{opt}(2) = \frac{\sigma_s^2}{\sigma_n^2}\left[M - \frac{\sigma_s^2 |v_1^H v_2|^2}{\sigma_n^2 + M\sigma_s^2}\right] \approx M\frac{\sigma_s^2}{\sigma_n^2}\left[1 - \frac{|v_1^H v_2|^2}{M^2}\right] \quad \text{FIG.6G}$$

$$\xi_n(c) = \sum_{i \in Sc} |v_n^H v_i|^2 \sum_{i \in Sc} \rho_{n,i} \quad \text{FIG.6H}$$

US 7,050,480 B2

CODE ASSIGNMENT ALGORITHM FOR SYNCHRONOUS DS-CDMA LINKS WITH SDMA USING ESTIMATED SPATIAL SIGNATURE VECTORS

CLAIM OF PRIORITY FROM COPENDING PROVISIONAL PATENT APPLICATION

This patent application claims priority from U.S. Provisional Patent Application No. 60/243,808, filed on Oct. 27, 2000, the disclosure of which is incorporated by reference herein in its entirety.

FIELD OF THE INVENTION

These teachings relate generally to wireless communications systems and methods, and relate in particular to techniques for assigning pseudo-noise (PN) spreading codes to users in a Synchronous Code Division Multiple Access (S-CDMA) system.

BACKGROUND OF THE INVENTION

In a synchronous direct-sequence code division multiple access (S-CDMA) system, users communicate simultaneously using the same frequency band via orthogonal modulation or spread spectrum. The number of orthogonal spreading codes (>1) limits the total capacity of the system. To increase the capacity of a CDMA system in a given service area, without requiring additional frequency bandwidth, space division multiple access (SDMA) can be employed.

In S-CDMA systems a set of orthogonal DS-CDMA codes are assigned to the cell of interest. However, the number of available orthogonal codes for a given spreading factor is limited, resulting in the capacity of the conventional S-CDMA system often being code limited.

SUMMARY OF THE INVENTION

In accordance with an aspect of these teachings, a code assignment algorithm is described for S-CDMA wireless communications systems that utilizes SDMA to enhance system capacity. The code assignment algorithm is applicable to both the forward and the reverse channels.

The inventors have realized that when SDMA is used in conjunction with S-CDMA it becomes possible to reuse code sequences within the same cell, thereby providing an increase in system capacity. Theoretically, with an M element antenna array receiver it is possible to reuse each code sequence M times.

SDMA is optimally achieved by exploiting the differences in spatial signature vectors (SSVs) of the various users in the cell. In general, the greater the difference in the SSVs of users assigned to a given spreading code, the greater is the SDMA isolation of the users' signals. Since the performance of the SDMA system is tightly linked to the spatial properties of the users with the same code, care is taken to insure that the set of users that are assigned an identical spreading code are spatially compatible. A good code assignment scheme in accordance with these teachings assigns identical codes to users having most dissimilar spatial properties.

In the presently preferred embodiment of these teachings a code assignment algorithm is based upon estimating the SSVs of active users. The properties of the estimated SSVs are then employed in an attempt to place users into spatially compatible groups. For convenience, this code assignment algorithm may be referred to herein as an SSV Based Code Assignment Algorithm (SBCAA).

A method in accordance with these teachings operates to assign system resources to users of a wireless communications system. In the preferred embodiment the method operates, within a coverage area of a base station (BS) or radio base unit (RBU) having a multi-element antenna array, for estimating a SSV for individual ones of a plurality of active subscriber stations (SSs) and assigns a spreading code to a subscriber station (SS) that minimizes the similarity of the determined SSVs of the SSs in a spreading code set. A metric used to measure the similarity of the spatial signature vectors of the SSs comprises the squared sum of the inner products of same code SSs' SSV with a current SS's SSV. The step of assigning includes calculating the magnitude of the squared inner product of the SSVs of all pairs of active SSs; using the calculated values for determining $\xi_n(c)$ for each spreading code that is not already used some specified maximum number of times; and assigning to a SS the spreading code with a minimum $\xi_n(c)$, where $\xi_n(c)$ is a SSV similarity metric.

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIG. 1 is simplified block diagram of a wireless access reference model that pertains to these teachings;

FIG. 2 is block diagram of a physical (PHY) system reference model showing a major data flow path;

FIG. 3 shows an Error Control Coding (ECC) and scrambling technique for single CDMA channel;

FIG. 4 is a Table illustrating exemplary parameters for a 3.5 MHz RF channelization;

FIG. 5 is a Table depicting an aggregate capacity and modulation factors versus modulation type and antenna array size (number of elements);

FIGS. 6A–6H are mathematical expressions useful in explaining the presently preferred embodiment of the use of spatial signature vectors;

DETAILED DESCRIPTION OF THE PREFERRED EMBODIMENTS

Figure 7:
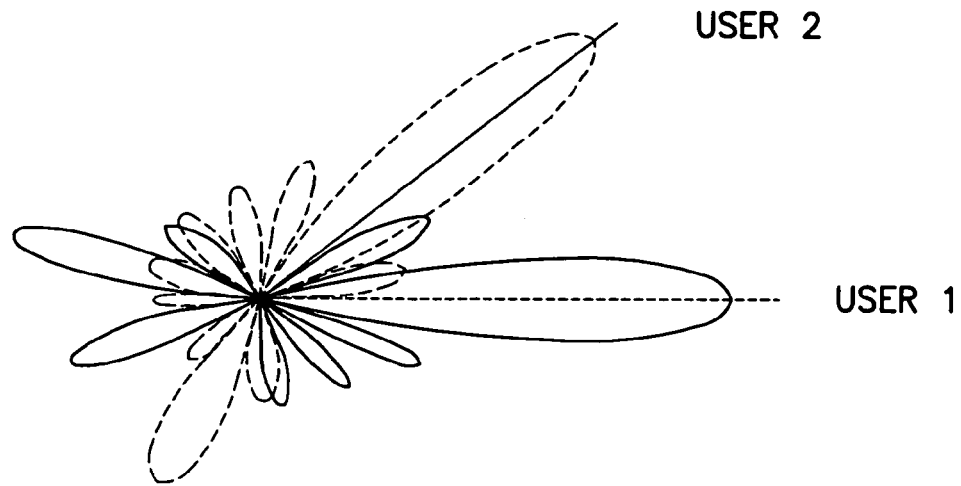
FIG. 7 is an illustration of SDMA for two users, wherein antenna patterns are used to provide orthogonal channels to the users.

Disclosed herein is a physical (PHY) system intended for IEEE 802.16 and related standards, although those having skill in the art should realize that various aspects of these teachings have wider applicability. The disclosed system is but one suitable embodiment for practicing the teachings of this invention.

The PHY technique is based on a hybrid synchronous DS-CDMA (S-CDMA) and FDMA scheme using quadrature amplitude modulation (QAM) and trellis coding. For a general background and benefits of S-CDMA with trellis-coded QAM one may refer to R. De Gaudenzi, C. Elia and R. Viola, "Bandlimited Quasi-Synchronous CDMA: A Novel Satellite Access Technique for Mobile and Personal Communication Systems," IEEE Journal on Selected Areas in Communications, Vol. 10, No. 2, February 1992, pp. 328–343, and to R. De Gaudenzi and F. Gianneti, "Analysis and Performance Evaluation of Synchronous Trellis-Coded CDMA for Satellite Applications," IEEE Transactions on Communications, Vol. 43, No. 2/3/4, February/March/April 1995, pp. 1400–1409.

The ensuing description focuses on a frequency division duplexing (FDD) mode. While a time division duplexing (TDD) mode is also within the scope of these teachings, the TDD mode is not discussed further.

What follows is an overview of the PHY teachings which will be useful in gaining a fuller understanding of the teachings of this invention.

The system provides synchronous direct-sequence code division multiple access (DS-CDMA) for both upstream and downstream transmissions. The system further provides spread RF channel bandwidths from 1.75–7 MHz, depending on target frequency band, and a constant chip rate from 1–6 Mcps (Million chips per second) within each RF sub-channel with common I-Q spreading. The chip rate depends on channelization of interest (e.g. 3.5 MHz or 6 MHz). The system features orthogonal, variable-length spreading codes using Walsh-Hadamard designs with spread factors (SF) of 1, 2, 4, 8, 16, 32, 64 and 128 chips/symbol being supported, and also features unique spreading code sets for adjacent, same-frequency cells/sectors. Upstream and downstream power control and upstream link timing control are provided, as are single CDMA channel data rates from 32 kbps up to 16 Mbps depending on SF (spreading factor) and chip rate. In the preferred system S-CDMA channel aggregation is provided for the highest data rates.

Furthermore, in the presently preferred embodiment FDMA is employed for large bandwidth allocations with S-CDMA in each FDMA sub-channel, and S-CDMA/FDMA channel aggregation is used for the higher data rates. Code, frequency and/or time division multiplexing is employed for both upstream and downstream transmissions. Frequency division duplex (FDD) or time division duplex (TDD) can be employed, although as stated above the TDD mode of operation is not described further. The system features coherent QPSK and 16-QAM modulation with optional support for 64-QAM. End-to-end raised-cosine Nyquist pulse shape filtering is employed, as is adaptive coding, using high-rate punctured, convolutional coding (K=7) and/or Turbo coding (rates of 4/5, 5/6 and 7/8 are typical). Data randomization using spreading code sequences is employed, as is linear equalization in the downstream with possible transmit pre-equalization for the upstream.

As will be described more fully below, also featured is the use of space division multiple access (SDMA) using adaptive beam-forming antenna arrays (e.g., 1 to 16 elements) at the base station.

FIG. 1 shows the wireless access reference model per the IEEE 802.16 FRD (see IEEE 802.16.3-00/02r4, "Functional Requirements for the 802.16.3 Interoperability Standard."). Within this model, the PHY technique in accordance with these teachings provides access between one or more subscriber stations (SS) 10, also referred to herein simply as users, and base stations (BS) 11 to support the user equipment 12 and core network 14 interface requirements. An optional repeater 16 may be deployed. In the preferred embodiment the BS 11 includes a multi-element adaptive array antenna 11A, as will be described in detail below. The BS 11 may also be referred to herein as a Radio Base Unit (RBU).

In FIG. 2, the PHY reference model is shown. This reference model is useful in discussing the various aspects of the PHY technique. As is apparent, the SS 10 and BS transmission and reception equipment may be symmetrical. In a transmitter 20 of the BS 11 or the SS 10 there is an Error Control Coding (ECC) encoder 22 for incoming data, followed by a scrambling block 24, a modulation block 26 and a pulse shaping/pre-equalization block 28. In a receiver 30 of the BS 11 or the SS 10 there is a matched filter/equalization block 32, a demodulation block 34, a descrambling block 36 and an ECC decoder 38. These various components are discussed in further detail below.

The PHY interfaces with the Media Access Control (MAC) layer, carrying MAC packets and enabling MAC functions based on Quality of Service (QoS) requirements and Service Level Agreements (SLAs). As a S-CDMA system, the PHY interacts with the MAC for purposes of power and timing control. Both power and timing control originate from the BS 11, with feedback from the SS 10 needed for forward link power control. The PHY also interacts with the MAC for link adaptation (e.g. bandwidth allocation and SLAs), allowing adaptation of modulation formats, coding, data multiplexing, etc.

With regard to frequency bands and RF channel bandwidths, the primary frequency bands of interest for the PHY include the ETSI frequency bands from 1–3 GHz and 3–11 GHz as described in ETSI EN 301 055, Fixed Radio Systems; Point-to-multipoint equipment; Direct Sequence Code Division Multiple Access (DS-CDMA); Point-to-point digital radio in frequency bands in the range 1 GHz to 3 GHz, and in ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz, as well as with the MMDS/MDS (digital TV) frequency bands. In ETSI EN 301 124, the radio specifications for DS-CDMA systems in the fixed frequency bands around 1.5, 2.2, 2.4 and 2.6 GHz are given, allowing channelizations of 3.5, 7, 10.5 and 14 MHz. Here, the Frequency Division Duplex (FDD) separation is specific to the center frequency and ranges from 54 to 175 MHz. In ETSI EN 301 124, Transmission and Multiplexing (TM); Digital Radio Relay Systems (DRRS); Direct Sequence Code Division Multiple Access (DS-CDMA) point-to-multipoint DRRS in frequency bands in the range 3 GHz to 11 GHz., the radio characteristics of DS-CDMA systems with fixed frequency bands centered around 3.5, 3.7 and 10.2 GHz are specified, allowing channelizations of 3.5, 7, 14, 5, 10 and 15 MHz. Here, FDD separation is frequency band dependant and ranges from 50 to 200 MHz. Also of interest to these teachings are the MMDS/ITSF frequency bands between 2.5 and 2.7 GHz with 6 MHz channelizations.

With regard to multiple access, duplexing and multiplexing, the teachings herein provide a frequency division duplex (FDD) PHY using a hybrid S-CDMA/FDMA multiple access scheme with SDMA for increased spectral efficiency. In this approach, a FDMA sub-channel has an RF channel bandwidth from 1.75 to 7 MHz. The choice of FDMA sub-channel RF channel bandwidth is dependent on the frequency band of interest, with 3.5 MHz and 6 MHz being typical per the IEEE 802.16 FRD. Within each FDMA sub-channel, S-CDMA is used with those users transmitting in the upstream and downstream using a constant chipping rate from 1 to 6 Mchips/second. While TDD could be used in a single RF sub-channel, this discussion is focused on the FDD mode of operation. Here, FDMA sub-channel(s) are used in the downstream while at least one FDMA sub-channel is required for the upstream. The approach is flexible to asymmetric data traffic, allowing more downstream FDMA sub-channels than upstream FDMA sub-channels when traffic patterns and frequency allocation warrant. Based on existing frequency bands, typical upstream/downstream FDMA channel separation range from 50 to 200 MHz.

Turning now to the Synchronous DS-CDMA (S-DS/CDMA) aspects of these teachings, within each FDMA sub-channel, S-CDMA is used in both the upstream and the downstream directions. The chipping rate is constant for all SS with rates ranging from 1 to 6 Mchips/second depending on the FDMA RF channel bandwidth. Common I-Q spreading is performed using orthogonal, variable-length spreading codes based on Walsh-Hadamard designs, with spread factors ranging from 1 up to 128 chips per symbol (see, for example, E. Dinan and G. Jabbari, "Spreading Codes for Direct Sequence CDMA and Wideband CDMA Cellular Networks," IEEE Communications Magazine, September 1998, pp.48–54. For multi-cell deployments with low frequency reuse, unique spreading code sets are used in adjacent cells to minimize interference.

An aspect of the preferred system embodiment is a symmetric waveform within each FDMA sub-channel, where both the upstream and downstream utilize the same chipping rate (and RF channel bandwidth), spreading code sets, modulation, channel coding, pulse shape filtering, etc.

Referring now to Code and Time Division Multiplexing and channel aggregation, with a hybrid S-CDMA/FDMA system it is possible to multiplex data over codes and frequency sub-channels. Furthermore, for a given code or frequency channel, time division multiplexing could also be employed. In the preferred approach, the following multiplexing scheme is employed.

For the downstream transmission with a single FDMA sub-channel, the channel bandwidth (i.e. capacity measured in bits/second) is partitioned into a single TDM pipe and multiple CDM pipes. The TDM pipe may be created via the aggregation of multiple S-CDMA channels. The purpose of this partition is based on the desire to provide Quality of Service (QoS). Within the bandwidth partition, the TDM pipe would be used for best effort service (BES) and for some assured forwarding (AF) traffic. The CDM channels would be used for expedited forwarding (EF) services, such as VoIP connections or other stream applications, where the data rate of the CDM channel is matched to the bandwidth requirement of the service.

The downlink could be configured as a single TDM pipe. In this case a time slot assignment may be employed for bandwidth reservation, with typical slot sizes ranging from 4–16 ms in length. While a pure TDM downlink is possible in this approach, it is preferred instead to employ a mixed TDM/CDM approach. This is so because long packets can induce jitter into EF services in a pure TDM link. Having CDMA channels (single or aggregated) dedicated to a single EF service (or user) reduces jitter without the need for packet fragmentation and reassembly. Furthermore, these essentially "circuit-switched" CDM channels would enable better support of legacy circuit-switched voice communications equipment and public switched telephone networks.

For the upstream, the preferred embodiment employs a similar partition of TDM/CDM channels. The TDM channel(s) are used for random access, using a slotted-Aloha protocol. In keeping with a symmetric waveform, recommended burst lengths are on the order of the slot times for the downlink, ranging from 4–16 ms. Multi-slot bursts are possible. The BS 11 monitors bursts from the SS 10 and allocates CDMA channels to SSs upon recognition of impending bandwidth requirements or based on service level agreements (SLAs). As an example, a BS 11 recognizing the initiation of a VoIP connection could move the transmission to a dedicated CDMA channel with a channel bandwidth of 32 kbps.

When multiple FDMA sub-channels are present in the upstream or downstream directions, similar partitioning could be used. Here, additional bandwidth exists which implies that more channel aggregation is possible. With a single TDM channel, data may be multiplexed across CDMA codes and across frequency sub-channels.

With regard now to Space Division Multiple Access (SDMA) extensions, a further aspect of this multiple access scheme involves the use of SDMA using adaptive beam-forming antennas. Reference can be made to J. Liberti and T. Rappaport, *Smart Antennas for Wireless CDMA,* Prentice-Hall PTR, Upper Saddle River, N.J., 1997, for details of beamforming with CDMA systems.

In the preferred embodiment the adaptive antenna array 11A at the BS 11 is provided with fixed beam SS antennas. In this approach the S-CDMA/FDMA channels can be directed at individual SSs. The isolation provided by the beamforming allows the CDMA spreading codes to be reused within the same cell, greatly increasing spectral efficiency. Beamforming is best suited to CDM rather than TDM channels. In the downstream, TDM would employ beamforming on a per slot or burst basis, increasing complexity. In the upstream, beamforming would be difficult since the BS 11 would need to anticipate transmission from the SS in order to form the beams appropriately. In either case, reuse of CDMA spreading codes in a TDM-only environment would be difficult. With CDM, however, the BS 11 may allocate bandwidth (i.e. CDMA channels) to the SS 10 based on need, or on SLAs. Once allocated, the BS 11 forms a beam to the SS 10 to maximize signal-to-interference ratios. Once the beam is formed, the BS 11 may allocate the same CDMA channel to one or more other SSs 10 in the cell. It is theoretically possible for the spectral efficiency of the cell to scale linearly with the number of antennas in the BS array 11A.

SDMA greatly favors the approach of "fast circuit-switching" over pure, TDM packet-switching in a CDMA environment. By "fast circuit-switching", what is implied is that packet data services are handled using dedicated connections, which are allocated and terminated based on bandwidth requirements and/or SLAs. An important consideration when providing effective packet-services using this approach lies in the ability of the BS 11 to rapidly determine bandwidth needs, and to both allocate and terminate connections rapidly. With fast channel allocation and termination, SDMA combined with the low frequency reuse offered by S-CDMA is a preferred option, in terms of spectral efficiency, for FWA applications.

A discussion is now made of waveform specifications. The waveform includes the channel coding 22, scrambling 24, modulation 26 and pulse shaping and equalization functions 28 of the air interface, as depicted in FIG. 2. Also included are waveform control functions, including power and timing control. In the presently preferred PHY, each CDMA channel (i.e. spreading code) uses a common waveform, with the spreading factor dictating the data rate of the channel.

With regard to the Error Control Coding (ECC) function 22 of FIG. 2, the ECC is preferably high-rate and adaptive. High rate codes are used to maximize the spectral efficiency of BWA systems using S-CDMA systems that are code-limited. In code-limited systems, the capacity is limited by the code set cardinality rather than the level of the multi-user interference. Adaptive coding is preferred in order to improve performance in multipath fading environments. For the coding options, and referring as well to FIG. 3, the baseline code is preferably a punctured convolutional code (CC). The constituent code may be the industry standard, rate ½, constraint length 7 code with generator $(133/171)_8$. Puncturing is used to increase the rate of the code, with rates of ¾, ⅘, ⅚ or ⅞ supported using optimum free distance puncturing patterns. The puncturing rate of the code may be adaptive to mitigate fading conditions. For decoding (block 38 of FIG. 2), a Viterbi decoder is preferred. Reference in this regard can be made again to the above-noted publication R. De Gaudenzi and F. Gianneti, "Analysis and Performance Evaluation of Synchronous Trellis-Coded CDMA for Satellite Applications," IEEE Transactions on Communications, Vol. 43, No. 2/3/4, February/March/April 1995, pp. 1400–1409, for an analysis of trellis-coded S-CDMA.

Turbo coding, including block turbo codes and traditional parallel and serial concatenated convolutional codes, are preferably supported as an option at the rates suggested above. In FIG. 3, the CC/Turbo coding is performed in block 22A, the puncturing in block 22B, and the scrambling can be performed using an XOR 24A that receives a randomizing cade.

Each CDMA channel is preferably coded independently. Independent coding of CDMA channels furthers the symmetry of the upstream and downstream waveform and enables a similar time-slot structure on each CDMA channel. The upstream and downstream waveform symmetry aids in cost reduction, as the SS 10 and BS 11 baseband hardware can be identical. The independent coding of each S-CDMA/FDMA channel is an important distinction between this approach and other multi-carrier CDMA schemes.

Randomization is preferably implemented on the coded bit stream. Rather than using a traditional randomizing circuit, it is preferred, as shown in FIG. 3, to use randomizing codes derived from the spreading sequences used by the transmitting station. Using the spreading codes allows different randomizing sequences to be used by different users, providing more robust randomization and eliminating problems with inter-user correlated data due to periodic sequences transmitted (e.g. preambles). Since the receiving station has knowledge of the spreading codes, de-randomization is trivial. Randomization may be disabled on a per channel or per symbol basis. FIG. 3 thus depicts the preferred channel coding and scrambling method for a single CDMA channel.

With regard to the modulation block 26, both coherent QPSK and square 16-QAM modulation formats are preferably supported, with optional support for square 64-QAM. Using a binary channel coding technique, Gray-mapping is used for constellation bit-labeling to achieve optimum decoded performance. This combined coding and modulation scheme allows simple Viterbi decoding hardware designed for binary codes to be used. Differential detection for all modulation formats may be supported as an option. Depending on the channel coding, waveform spectral efficiencies from 1 to 6 information bits/symbol are realized.

The modulation format utilized is preferably adaptive based on the channel conditions and bandwidth requirements. Both upstream and downstream links are achievable using QPSK waveform provided adequate SNR. In environments with higher SNR, up and downstream links may utilize 16-QAM and/or 64-QAM modulation formats for increased capacity and spectral efficiency. The allowable modulation format depends on the channel conditions and the channel coding being employed on the link.

In the preferred embodiment, end-to-end raised-cosine Nyquist pulse shaping is applied by block 28 of FIG. 2, using a minimum roll-off factor of 0.25. Pulse shape filtering is designed to meet relevant spectral masks, mitigate inter-symbol interference (ISI) and adjacent FDMA channel interference.

To mitigate multipath fading, a linear equalizer 32 is preferred for the downstream. Equalizer training may be accomplished using a preamble, with decision-direction used following initial training. With S-CDMA, equalizing the aggregate signal in the downlink effectively equalizes all CDMA channels. Multipath delay spread of less than 3 μs is expected for Non-Line Of Sight (NLOS) deployments using narrow-beam (10–20°) subscriber station 10 antennas (see, for example, J. Porter and J. Thweat, "Microwave Propagation Characteristics in the MMDS Frequency Band," Proceedings of IEEE International Conf. On Communications (ICC) 2000, New Orleans, La., USA, June 2000, and V. Erceg, et al, "A Model for the Multipath Delay Profile of Fixed Wireless Channels," IEEE Journal on Selected Areas in Communications (JSAC), Vol. 17, No. 3, March 1999, pp. 399–410.

The low delay spread allows simple, linear equalizers with 8–16 taps that effectively equalize most channels. For the upstream, pre-equalization may be used as an option, but requires feedback from the subscriber station due to frequency division duplexing.

Timing control is required for S-CDMA. In the downstream, timing control is trivial. However, in the upstream timing control is under the direction of the BS 11. Timing control results in reduced in-cell interference levels. While infinite in-cell signal to interference ratios are theoretically possible, timing errors and reduction in code-orthogonality from pulse shape filtering allows realistic signal to in-cell interference ratios from 30–40 dB. In asynchronous DS-CDMA (A-CDMA) systems, higher in-cell interference levels exist, less out-of-cell interference can be tolerated and higher frequency reuse is needed to mitigate out-of-cell interference (see, for example, T. Rappaport, *Wireless Communications: Principles and Practice,* Prentice-Hall PTR, Upper Saddle River, N.J., 1996, pp. 425–431. The ability of timing-control to limit in-cell interference is an important aspect of achieving a frequency reuse of one in a S-CDMA system.

Power control is also required for S-CDMA systems. Power control acts to mitigate in-cell and out-of-cell interference while also ensuring appropriate signal levels at the SS 10 or the BS 11 to meet bit error rate (BER) requirements. For a SS 10 close to the BS 11, less transmitted power is required, while for a distant SS 10, more transmit power is required in both the up and downstream. As with timing control, power control is an important aspect of achieving a frequency reuse of one.

Turning now to a discussion of capacity, spectral efficiency and data rates, for a single, spread FDMA channel, the presently preferred S-CDMA waveform is capable of providing channel bandwidths from 1 to 16 Mbps. Using variable-length spreading codes, each CDMA channel can be configured to operate from 32 kbps (SF=128) to 16 Mbps (SF=1), with rates depending on the modulation, coding and RF channel bandwidths. With S-CDMA channel aggregation, high data rates are possible without requiring a SF of one. In general, the use of S-CDMA along with the presently preferred interference mitigation techniques enable the system to be code-limited. Note, mobile cellular A-CDMA systems are always interference-limited, resulting in lower spectral efficiency. Recall also that in code-limited systems, the capacity is limited by the code set cardinality rather than the level of the multi-user interference. In a code-limited environment, the communications channel bandwidth of the system is equal to the communications channel bandwidth of the waveform, assuming a SF of one. In the Table shown in FIG. 4 sample parameters are shown for a hypothetical system using different coded modulation schemes and assuming a code-limited DS-CDMA environment. The Table of FIG. 4 illustrates potential performance assuming a single 3.5 MHz channel in both the upstream and downstream. The numbers reported apply to both the upstream and downstream directions, meaning that upwards of 24 Mbps full duplex is possible (12 Mbps upstream and 12 Mbps downstream). With additional FDMA RF channels or large RF channels (e.g. 6 MHz), additional communication bandwidth is possible with the same modulation factors from the Table. As an example, allocation of 14 MHz could be serviced using 4 FDMA RF channels with the parameters described in the Table of FIG. 4. At 14 MHz, peak data rates to a given SS 10 of up to 48 Mbps are achievable, with per-CDMA channel data rates scaling up from 32 kbps. The channel aggregation method in accordance with these teachings is very flexible in servicing symmetric versus asymmetric traffic, as well as for providing reserved bandwidth for QoS and SLA support.

With regard to multi-cell performance, to this point both the capacity and spectral efficiency have been discussed in the context of a single, isolated cell. In a multi-cell deployment, S-CDMA enables a true frequency reuse of one. With S-CDMA, there is no need for frequency planning, and spectral efficiency is maximized. With a frequency reuse of one, the total system spectral efficiency is equal to the modulation factor of a given cell. Comparing S-CDMA to a single carrier TDMA approach, with a typical frequency reuse of 4, TDMA systems must achieve much higher modulation factors in order to compete in terms of overall system spectral efficiency. Assuming no sectorization and a frequency reuse of one, S-CDMA systems can achieve system spectral efficiencies from 1 to 6 bps/Hz, with improvements being possible with SDMA.

While frequency reuse of one is theoretically possible for DS-CDMA, the true allowable reuse of a specific deployment is dependent on the propagation environment (path loss) and user distribution. For mobile cellular systems, it has been shown that realistic reuse factors range from 0.3 up to 0.7 for A-CDMA: factors that are still much higher than for TDMA systems. In a S-CDMA system, in-cell interference is mitigated by the orthogonal nature of the S-CDMA, implying that the dominant interference results from adjacent cells. For the fixed environments using S-CDMA, true frequency reuse of one can be achieved for most deployments using directional SS 10 antennas and up and downstream power control to mitigate levels of adjacent cell interference. In a S-CDMA environment, true frequency reuse of one implies that a cell is code-limited, even in the presence of adjacent cell interference.

For sectorized deployments with S-CDMA, a frequency reuse of two is preferred to mitigate the interference contributed by users on sector boundaries. In light of this reuse issue, it is preferred, but not required, to use SDMA with adaptive beamforming, rather than sectorization, to improve cell capacity. Since spectral efficiency translates directly into cost, the possibility of a frequency reuse of one is an important consideration.

The use of SDMA in conjunction with S-CDMA offers the ability to dramatically increase system capacity and spectral efficiency. SDMA uses the antenna array 11A at the BS 11 to spatially isolate same code SSs 10 in the cell. The number of times that a code may be reused within the same cell is dependent upon the number of antenna elements in the array 11A, the array geometry, the distribution of users in the cell, the stability of the channel, and the available processing power. Theoretically, in the absence of noise, with an M element antenna array 11A it is possible to reuse each code sequence M times, thereby increasing system capacity by a factor of M. In practice, the code reuse is slightly less than M due to implementation loss, frequency selective multipath fading, and receiver noise. Regardless, significant capacity gains are achievable with SDMA. With appropriate array geometry and careful grouping of users sharing CDMA codes, it is possible to achieve a code reuse of 0.9M or better.

In an actual deployment the number of antenna elements of the antenna array 11A is limited by the available processing power, the physical tower constraints, and system cost (e.g. the number of additional RF front ends (RFFEs)). Selected array sizes vary depending upon the required capacity of the given cell on a cell-by-cell basis. The Table shown in FIG. 5 illustrates the achievable aggregate capacity and modulation factor with typical array sizes, assuming a code reuse equal to the number of antenna elements. The aggregate capacity is defined as the total data rate of the BS 11. Modulation factors exceeding 56 bps/Hz are achievable with 64 QAM and a sixteen-element antenna array 11A. It should be noted that while SDMA increases the capacity of cell, it does not increase the peak data rate to a given SS 10.

The PHY system disclosed herein is very flexible. Using narrowband S-CDMA channels, the PHY system can adapt to frequency allocation, easily handling noncontiguous frequency allocations. The data multiplexing scheme allows great flexibility in servicing traffic asymmetry and support of traffic patterns created by higher-layer protocols such as the Transmission Control Protocol (TCP) or the Real Time Protocol (RTP).

Deployments using the disclosed PHY are also very scalable. When traffic demands increase, new frequency allocation can be used. This involves adding additional FDMA channels, which may or may not be contiguous with the original allocation. Without additional frequency allocation, cell capacity can be increased using the adaptive antenna array 11A and SDMA.

The high spectral efficiency of the disclosed waveform leads to cost benefits. High spectral efficiency implies less frequency bandwidth is required to provide a certain amount of capacity.

Using a symmetric waveform (i.e., a waveform that is the same in the upstream and downstream directions) is a cost saving feature, allowing the use of common baseband hardware in the SS 10 and the BS 11. The use of CDMA technology also aids in cost reduction, as some CDMA technology developed for mobile cellular applications may be applicable to gain economies of scale.

As a spread spectrum signal, the preferred waveform offers inherent robustness to interference sources. Interference sources are reduced by the spreading factor, which ranges from 1 to 128 (interference suppression of 0 to 21 dB.) At the SS 10, equalization further suppresses narrowband jammers by adaptively placing spectral nulls at the jammer frequency. Additional robustness to interference is achieved by the directionality of the SS antennas, since off-boresight interference sources are attenuated by the antenna pattern in the corresponding direction. At the BS 11, the antenna array 11A used to implement SDMA offers the additional benefit of adaptively steering nulls towards unwanted interference sources.

The presently preferred waveform exhibits several properties that make it robust to channel impairments. The use of spread spectrum makes the waveform robust to frequency selective fading channels through the inherent suppression of inter-chip interference. Further suppression of inter-chip interference is provided by equalization at the SS 10. The waveform is also robust to flat fading channel impairments. The adaptive channel coding provides several dB of coding gain. The antenna array 11A used to implement SDMA also functions as a diversity combiner. Assuming independent fading on each antenna element, diversity gains of M are achieved, where M is equal to the number of antenna elements in the antenna array 11A. Finally, since the S-CDMA system is code-limited rather than interference limited, the system may run with a large amount of fade margin. Even without equalization or diversity, fade margins on the order of 10 dB are possible. Therefore, multipath fades of 10 dB or less do not increase the BER beyond the required level.

The adaptive modulation also provides some robustness to radio impairments. For receivers with larger phase noise, the QPSK modulation offers more tolerance to receiver phase noise and filter group delay. The adaptive equalizer at the SS 10 reduces the impact of linear radio impairments. Finally, the use of clipping to reduce the peak-to-average power ratio of the transmitter signal helps to avoid amplifier saturation, for a given average power output.

An important distinction between the presently preferred embodiment and a number of other CDMA approaches is the use of a synchronous upstream, which allows the frequency reuse of one. Due to some similarity with mobile cellular standards, cost savings are possible using existing, low-cost CDMA components and test equipment.

The presently preferred PHY is quite different from cable modem and xDSL industry standards, as well as existing IEEE 802.11 standards. With a spreading factor of one chip/symbol, the PHY supports a single-carrier QAM waveform similar to DOCSIS 1.1 and IEEE 802.16.1 draft PHY (see "Data-Over-Cable Service Interface Specifications: Radio Frequency Interface Specification", SP-RF1v1.1-105-000714, and IEEE 802.16.1-00/01r4, "Air Interface for Fixed Broadband Wireless Access Systems", September 2000.)

The presently preferred PHY technique provides an optimum choice for IEEE 802.16A and for other applications. An important aspect of the PHY is its spectral efficiency, as this translates directly to cost measured in cost per line or cost per carried bit for FWA systems. With a frequency reuse of one and efficient support of SDMA for increased spectral efficiency, the combination of S-CDMA with FDMA is an optimum technology for the fixed wireless access market.

Benefits of the presently preferred PHY system include: High spectral efficiency (1–6 bps/Hz system-wide), even without SDMA; Compatibility with smart antennas (SDMA), with system-wide spectral efficiency exceeding 20 bps/Hz possible; and A frequency reuse of one is possible (increased spectral efficiency and no frequency planning).

The use of S-CDMA provides robustness to channel impairments (e.g. multipath fading): robustness to co-channel interference (allows frequency reuse of one); and security from eavesdropping.

Also provided is bandwidth flexibility and efficiency support of QoS requirements, flexibility to support any frequency allocation using a combination of narrowband S-CDMA combined with FDMA, while adaptive coding and modulation yield robustness to channel impairments and traffic asymmetries.

The use of these teachings also enables one to leverage mobile cellular technology for reduced cost and rapid technology development and test. Furthermore, cost savings are realized using the symmetric waveform and identical SS 10 and BS (RBU) 11 hardware.

Having thus described the overall PHY system, a more detailed discussion will now be made of an aspect thereof that is particularly pertinent to these teachings. More specifically, a discussion will now be made of the presently preferred SSV Based Code Assignment Algorithm (SB-CAA). For the purposes of this description it is assumed that the RBU 11 includes or has access to a data processor that is capable of executing program steps that implement the code assignment algorithm, as discussed in detail below.

Discussing first the signal model, it is assumed that the Radio Base Unit 11 is equipped with the above-described M element antenna array 11A. Let x(t) denote the received signal vector that is observed at the antenna outputs at time t. For a multipath channel, the analytic received signal vector component due to user n is given by the expression shown in FIG. 6A, where $L_n$ is the number of signal components and $s_n(t)$ is the analytic transmitted signal of the $n^{th}$ user. For CDMA systems, $s_n(t)=c_n(t)b_n(t)\exp(-j\omega_c t)$, where $c_n(t)$ is the CDMA spreading code, $b_n(t)$ is the sequence of data bits, and $\omega_c$ is the carrier frequency in radians per second. The parameters $\alpha_{nl}$, $\tau_{nl}$ and $\theta_{nl}$ denote the complex amplitude, path delay and azimuth angle of arrival of the $l^{th}$ path of the $n^{th}$ user, respectively. The vector $a(\theta_{nl})$ is the response vector of the antenna array 11A in the direction of $\theta_{nl}$. Assuming a flat fading channel environment, $x_n(t)$ may be expressed as $x_n(t)=v_n s_n(t)$, where the equation of FIG. 6B shows the derivation of $v_n$, which is defined as the spatial signature vector (SSV) of user n. It is the SSVs of each of the users that determine the performance of the SDMA system.

SDMA exploits the differences in the spatial characteristics of the various users in the channel to provide nearly orthogonal channels to the users. An illustration of SDMA is shown in FIG. 7. The RBU 11 uses different effective beam patterns to isolate the users' signals. In this case the antenna pattern of user 1 has a null in the direction of user 2 and vice versa. In this way, the two users are able to access the RBU 11 resources using the same frequency, at the same time, and with the same spreading code, without interfering with one another.

Figure 8:
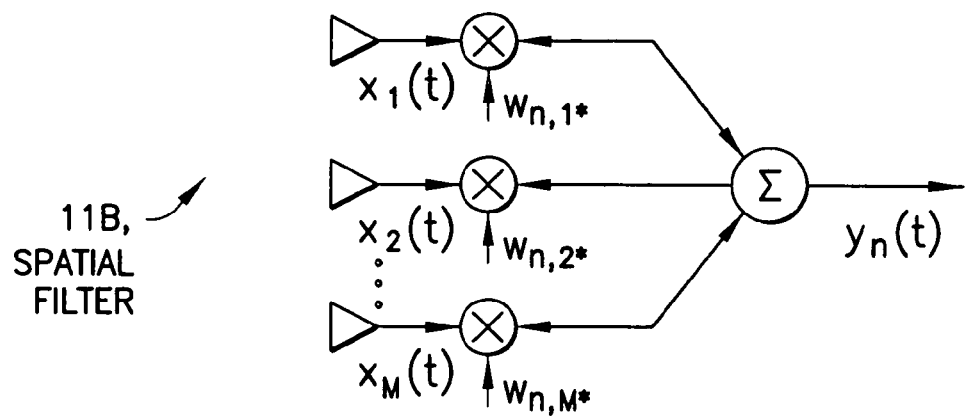
FIG. 8 is a circuit diagram of a spatial filter for user n.

The effective antenna patterns of each user are generated by summing amplitude scaled and phase rotated versions of the signals observed at each antenna element, as is made more apparent in diagram of the spatial filter 11B shown in FIG. 8. The antenna array 11A output for user n may be expressed in accordance with the mathematical expression shown in FIG. 6C, where $y_n(t)$ is the output of the spatial filter 11B, $w_{n,l}$ is the complex weight applied to the ith antenna element, $x_l(t)$ is the signal present on the ith channel, and * denotes complex conjugate. To each user is applied a unique set of weights, thereby yielding different effective antenna patterns. The process may be referred to as beamforming or as spatial filtering.

It can be shown that the weight vector that maximizes the output signal to interference plus noise ratio (SINR) is given by $w_n = R_{ii}^{-1}(n)v_n$, where $v_n$ is the spatial signature of user n and $R_{ii}(n)$ is the corresponding interference plus noise correlation matrix. The interference plus noise correlation matrix $R_{ii}(n)$ may be expressed as shown in the mathematical expression of FIG. 6D, wherein N denotes the number of interfering signals, $\sigma_s^2$ is the variance of the analytic received signal that is assumed to be equal for each user due to power control, and $\sigma_n^2$ is the variance of the additive white noise in the channel. The output SINR present at the array 11A output corresponding to the optimum weight vector is given by the expression shown in FIG. 6E.

The assignment of spreading codes has the potential to have a major impact on the performance of the SDMA system. A presently preferred algorithm for assigning CDMA codes to users is now described. The algorithm attempts to minimize the similarity of the SSVs of the users in each code set. A presently preferred metric used to measure the similarity of the spatial signature vectors of the users is the squared sum of the inner products of the same code users' SSV with the current user's SSV.

To understand the motivation behind the use of this presently preferred metric, consider the separation of two users. In this case the optimum SINR equation presented in FIG. 6E may be expressed in the form shown in FIG. 6F. For equal power users in a line of sight (LOS) channel, $\backslash v_1 \backslash^2 = \backslash v_2 \backslash^2 = M$, where M is the number of antenna elements in the antenna array 11A. In this case the optimum output SINR for both users can be expressed as shown in the equation of FIG. 6G. Note that the optimum output SINR is a function of the squared inner product of $v_1$ and $v_2$. For convenience, let $\rho_{i,j} = ?v_i^H v_j?^2$. When there are more than two users in the environment, then the optimum output SINR is a function of just $\rho_{i,j} = ?v_i^H v_j?^2$ for each user, but is also dependent upon the phase of the inner products of the SSVs. Regardless, it can be shown through simulation that there is a negative correlation between the output SINR and the quantity shown in the equation of FIG. 6H, where $S_c$ denotes the set of users already assigned to code c.

With regard to the estimation of the SSV, in the forward link (BS 11 to SS 10) the SSV may be estimated using forward link probing signals, as described by D. Gerlach and A. Paulraj, Adaptive transmitting antenna arrays with feedback, IEEE Signal Processing Letters, vol. 1, pp. 150–152, October 1994. In the reverse link direction (SS 10 to BS 11) the SSV may be estimated using known or estimated data transmitted by the SS 10. For the SS 10 that is transmitting on a non-shared PN code, the SSV maybe estimated by despreading the signal on each antenna element. The vector of the despread signal values is itself an estimate of the SSV. To average over multiple symbols, the known or estimated phase of the transmitted data is removed prior to averaging. For the SS 10 that is transmitting on a shared PN code, unique training data is transmitted by each SS 10. The training patterns are designed such that the same-code users are orthogonal (separable). The SSV of each SS 10 is found by removing the known phase of the transmitted data from the despread data, and then averaging over the length of the training data. The average vector is itself an estimate of the SSV. The estimated SSV, obtained by whatever means, is then applied in the manner discussed above.

Figure 9:
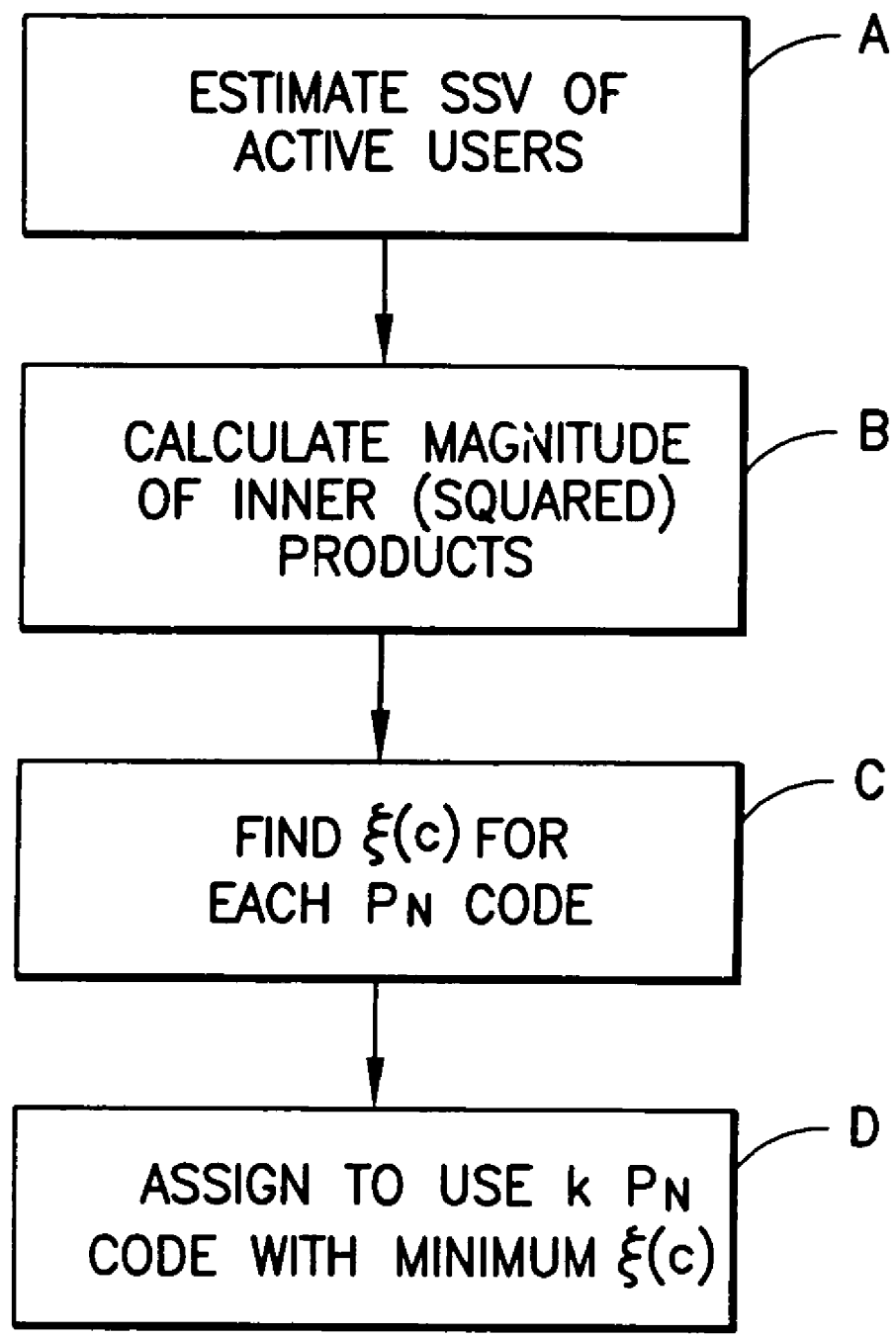
FIG. 9 is a logic flow diagram illustrating the operation of a SSV-based CDMA code assignment algorithm.

FIG. 9 is a logic flow diagram illustrating the operation of the SSV-based CDMA code assignment algorithm in accordance with the teachings of this invention. Step A: Estimate the SSV of all active users. Step B: Calculate the magnitude of the squared inner product of the SSVs of all pairs of active users. Step C: Using the values calculated in Step B, find $\xi_n(c)$ for each code that is not already used some specified maximum number of times, where $\xi_n(c)$ may be considered to be a spatial signature vector similarity metric. Step D. Assign to user k the code with the minimum $\xi_n(c)$.

A simulation can be performed to compare the performance of the presently preferred SSV-based code assignment algorithm with a random assignment of codes to users. For example, assume that the RBU 11 is equipped with a 16 element circular antenna array 11A with an adjacent element spacing of five wavelengths, and that 120 codes are shared amongst the users. The total number of active users is then 16×120=1920. Users are distributed in azimuth according to a random uniform distribution over the range of [0,2π]. Only the LOS for each user is considered. It is also assumed that power control is used on the reverse link (SS 10 to RBU 11) such that all of the users are received with equal power. The assumed SNR of the signal observed on each antenna element for a given user after despreading is 15 dB. The cumulative distribution function (cdf) of the array 11A output signal to the interference plus noise ratio (SINR) is calculated from the SINR of each user, over ten independent trials of user placements.

Figure 10:
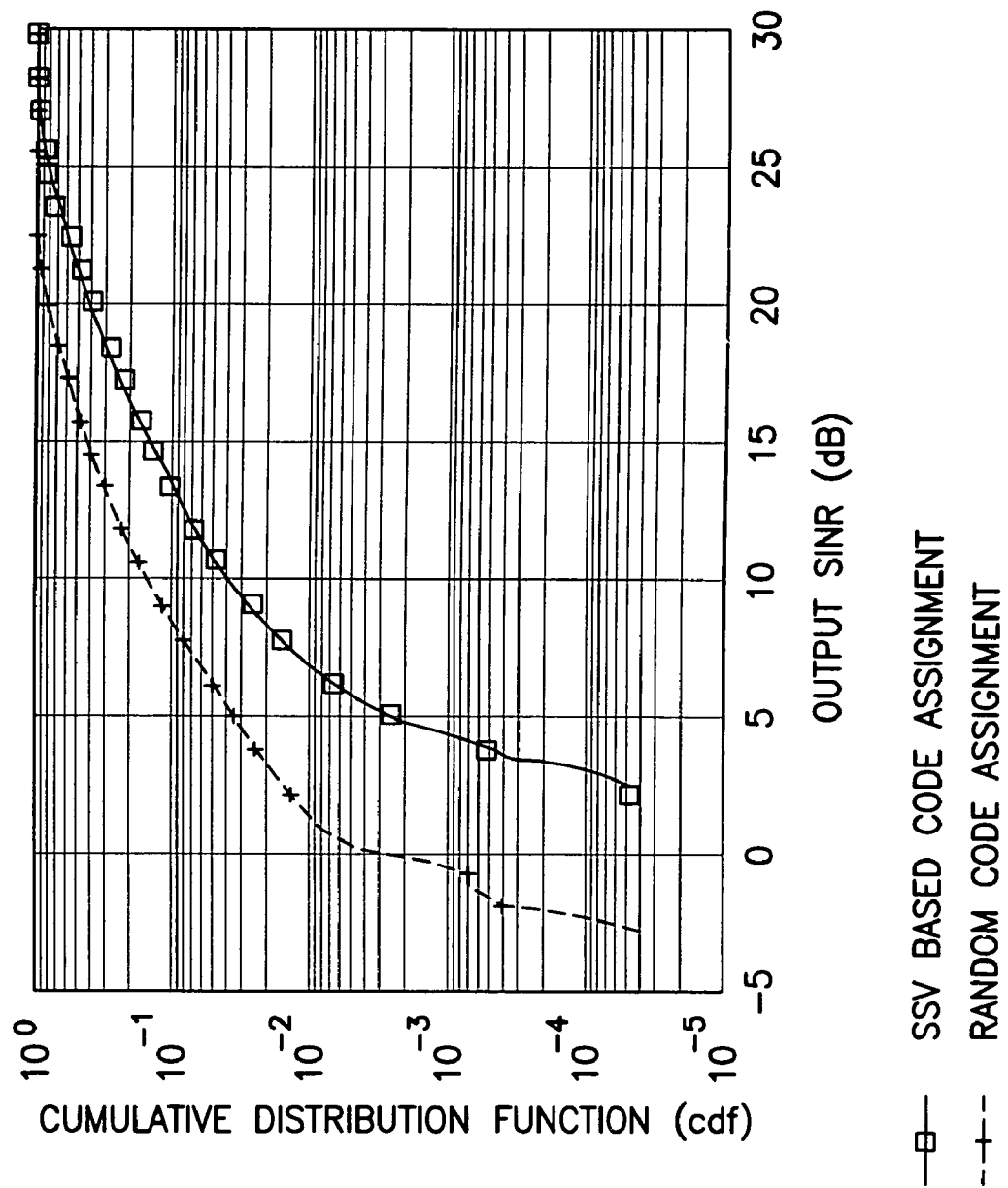
FIG. 10 is a graph showing SINR versus a cumulative distribution function (cdf) for SSV-based code assignment, in accordance with these teachings, and for a random code assignment.
Figure 11:
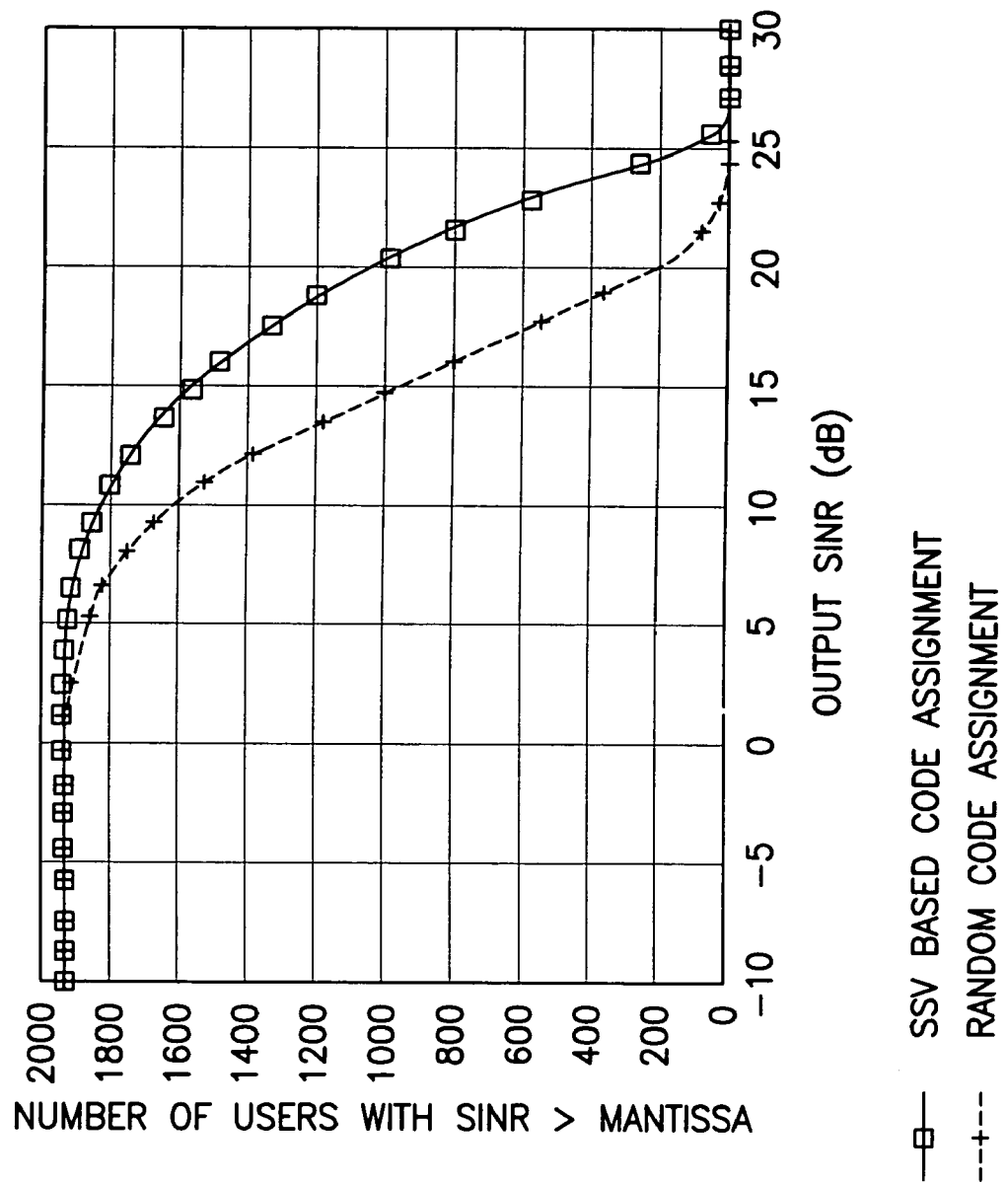
FIG. 11 is a graph showing the number of users supported versus the required antenna array output SINR for the SSV-based code assignment and for a random code assignment.
Figure 12:
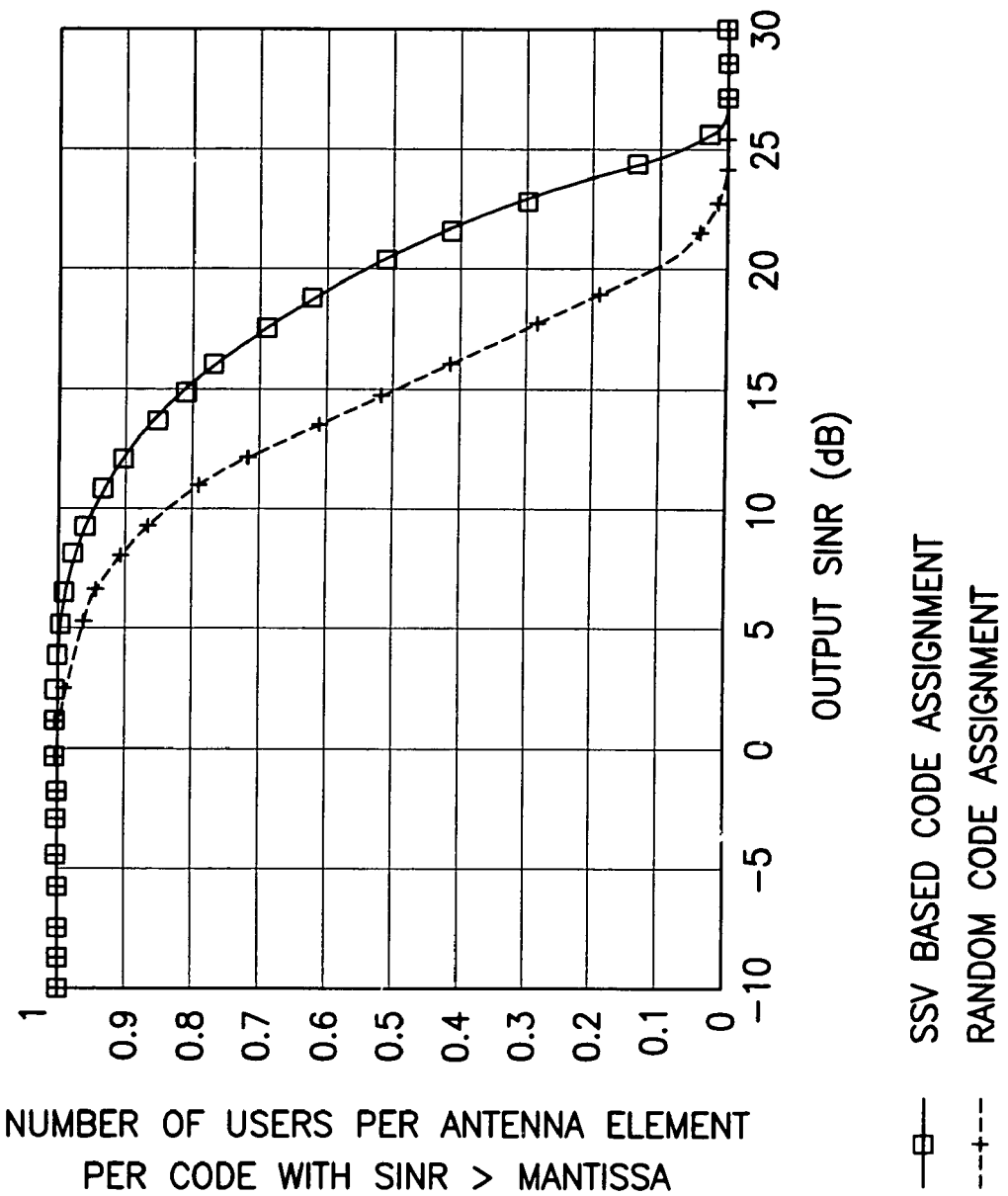
FIG. 12 is a graph showing a number of users supported per antenna element per code versus the required SINR for SSV-based code assignment and for a random code assignment.

The cdf of the array output SINR is shown in the graph of FIG. 10. The output SINR obtained by using the presently preferred code assignment algorithm is between 3 to 5 dB higher than that obtained through random code assignment. In FIG. 11 the number of users are shown having an array output SINR that is greater than the specified threshold level. For example, 1541 users have an array output SINR that exceeds 15 dB using the presently preferred code assignment algorithm, whereas only 954 have an array output SINR that exceeds 15 dB using random code assignment. FIG. 12 shows the number of users per antenna element per code with an output SINR greater than the mantissa (a quantity having a good figure of merit in which to compare the performance of antenna arrays with differing numbers of antenna elements.)

It can thus be seen that by using the presently preferred SSV-based code assignment algorithm approximately 1.6 times as many users have an output SINR that exceeds the original input SINR, as compared to randomly assigning spreading codes to users. The factor of improvement is even greater when comparing the number of users at higher output SINRs.

While described in the context of a S-CDMA system, it should be appreciated that these teachings have applicability as well to other types of wireless systems wherein users share system resources, such as time slots and/or frequency channels. As such, the teachings have applicability as well to, for example, TDMA and FDMA systems. Furthermore, these teachings need not be limited to synchronous wireless systems, as asynchronous wireless systems may benefit as well from their use. Furthermore, while described in the context of various exemplary modulation and channel coding formats, frequencies, numbers of antenna elements, spreading factors, symbol rates and the like, it should be realized that these are exemplary, and are not to be construed in a limiting sense upon the practice of this invention.

Thus, while these teachings have been particularly shown and described with respect to preferred embodiments thereof, it will be understood by those skilled in the art that changes in form and details may be made therein without departing from the scope and spirit of the invention described above.

What is claimed is:

1. A method for operating a wireless communications system for assigning system resources to users, comprising:
   within a coverage area of a base station (BS) having a multi-element antenna array, estimating a spatial signature vector (SSV) for individual ones of a plurality of active subscriber stations (SSs); and
   assigning a system resource to a subscriber station (SS) that minimizes the similarity of the determined SSVs of the SSs sharing the system resource, wherein a metric used to measure the similarity of the spatial signature vectors of the SSs comprises the squared sum of the inner products of the SSs' SSV, that share the resource, with the current SS's SSV.

2. A method for operating a wireless communications system for assigning system resources to users, comprising:
   within a coverage area of a base station (BS) having a multi-element antenna array, estimating a spatial signature vector (SSV) for individual ones of a plurality of active subscriber stations (SSs); and
   assigning a system resource to a subscriber station (SS) that minimizes the similarity of the determined SSVs of the SSs sharing the system resource, wherein the step of assigning includes calculating the magnitude of the squared inner product of the SSVs of all pairs of active SSs; using the calculated values for determining a spatial signature vector similarity metric for the resource; and assigning to a SS the system resource having a minimum spatial signature vector similarity metric.

3. A method as in claim 1, and further comprising beamforming using the multi-element antenna array so as to maximize the signal to interference plus noise ratio (SINR) for a signal transmitted from a first SS by steering a null towards a second potentially interfering SS to minimize interference from the second SS.

4. A method as in claim 3, wherein the step of beamforming comprises a step of receiving the signal received from the desired SS, followed by a step of spatial filtering.

5. A method as in claim 3, wherein the step of beamforming comprises steps of operating the SSs to obtain channel estimates comprised of the path amplitude and phase from each of m antenna elements and to use the m channel estimates as a spatial signature vector, and from the spatial signature vectors received from a plurality of same-code subscriber stations, computing antenna element weight vectors.

6. A synchronous space division multiple access, code division multiple access communications system, comprising a data processor for estimating, within a coverage area of a radio base unit (RBU) having a multi-element antenna array, a spatial signature vector (SSV) for individual ones of a plurality of active subscriber stations (SSs) and for assigning a spreading code to a subscriber station (SS) that minimizes the similarity of the determined SSVs of the SSs in a code set, wherein a metric used by said data processor to measure the similarity of the spatial signature vectors of the SSs comprises the squared sum of the inner products of same code SSs' SSV with a current SS's SSV.

7. A sychronous space division multiple access, code division multiple access communications system, comprising a data processor for estimating, within a coverage area of a radio base unit (RBU) having a multi-element antenna array, a spatial signature vector (SSV) for individual ones of a plurality of active subscriber stations (SSs) and for assigning a spreading code to a subscriber station (SS) that minimizes the similarity of the determined SSVs of the SSs in a code set,
wherein said data processor operates to calculate the magnitude of the squared inner product of the SSVs of all pairs of active Sss, uses the calculated values for finding a spatial signature vector similarity metric for each spreading code that is not already used some specified maximum number of times, and assigns to a SS the spreading code with a minimum spatial signature vector similarity metric.

8. A system as in claim 6, wherein said data processor further operates beamforming circuitry with said multi-element antenna array so as to maximize the signal to interference plus noise ratio (SINR) for a signal transmitted from a first SS by steering a null towards a second same-code SS to minimize interference from the second same-code SS.

9. A system as in claim 8, wherein said beamforming circuitry comprises a despreader for despreading a signal received from SSs and a spatial filter having an input coupled to an output of said despreader.

10. A system as in claim 9, wherein for a case of independent fading on each antenna element of said antenna array, said system achieves a diversity gain of M, where M is equal to the number of antenna elements of said antenna array.

11. A method for operating a synchronous space division multiple access, code division multiple access communications system for assigning spreading codes to users, comprising:
    within a coverage area of a base station (BS) having a multi-element antenna array, estimating a spatial signature vector (SSV) for individual ones of a plurality of active subscriber stations (SSs); and
    assigning a spreading code to a subscriber station (SS) that minimizes the similarity of the determined SSVs of the SSs in a code set wherein a metric used to measure the similarity of the spatial signature vectors of the SSs comprises the squared sum of the inner products of the same code SSs' SSV with the current SS's SSV.

12. A method for operating a synchronous space division multiple access, code division multiple access communications system for assigning spreading codes to users, comprising:
    within a coverage area of a base station (BS) having a multi-element antenna array, estimating a spatial signature vector (SSV) for individual ones of a plurality of active subscriber stations (SSs); and
    assigning a spreading code to a subscriber station (SS) that minimizes the similarity of the determined SSVs of the SSs in a code set wherein the step of assigning includes calculating the magnitude of the squared inner product of the SSVs of all pairs of active SSs; using the calculated values for determining a spatial signature vector similarity metric for each spreading code that is not already used some specified maximum number of times; and assigning to a SS the spreading code with a minimum spatial signature vector similarity metric.

13. A method as in claim 11, and further comprising beamforming using the multi-element antenna array so as to maximize the signal to interference plus noise ratio (SINR) for a signal transmitted from a first SS by steering a null towards a second same-code SS to minimize interference from the second same-code SS.

14. A method as in claim 13 wherein the step of beamforming comprises a step of despreading the signal received from the desired SS, followed by a step of spatial filtering.

15. A method as in claim 13, wherein the step of beamforming comprises steps of operating the SSs to obtain channel estimates comprised of the path amplitude and phase from each of m antenna elements and to use the m channel estimates as a spatial signature vector, and from the spatial signature vectors received from a plurality of same-code subscriber stations, computing antenna element weight vectors.

16. A method for operating a code division multiple access communications system, comprising:

estimating a spatial signature vector for individual ones of a plurality of active users located within a coverage area of a base station that operates with a multi-element antenna array;

calculating the magnitude of the squared inner product of the spatial signature vectors of pairs of active users;

using the calculated values of the magnitude of the squared inner product of the spatial signature vectors for determining a spatial signature vector similarity metric for spreading codes not already in use some maximum number of times; and assigning a spreading code to a user that minimizes the spatial signature vector similarity metric.

* * * * *